(12) United States Patent
Chen

(10) Patent No.: US 7,400,462 B2
(45) Date of Patent: Jul. 15, 2008

(54) OPTICAL SYSTEM HAVING LENSES WITH ADJUSTABLE FOCAL LENGTH

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/432,567

(22) Filed: May 10, 2006

(65) Prior Publication Data
US 2007/0076304 A1    Apr. 5, 2007

(30) Foreign Application Priority Data
Sep. 30, 2005    (CN) .................. 2005 1 0100058

(51) Int. Cl.
G02B 7/02    (2006.01)
(52) U.S. Cl. ...................................... 359/820; 359/822

(58) Field of Classification Search ............... 359/642, 359/721, 808, 819–829, 811
See application file for complete search history.

(56) References Cited
U.S. PATENT DOCUMENTS

| | | | | |
|---|---|---|---|---|
| 4,865,426 A | * | 9/1989 | Matsuoka et al. ........... 359/289 |
| 5,659,808 A | * | 8/1997 | Okada ......................... 396/55 |
| 5,731,909 A | * | 3/1998 | Schachar .................... 359/676 |
| 6,930,838 B2 | | 8/2005 | Schachar | |

* cited by examiner

*Primary Examiner*—Scott J. Sugarman
*Assistant Examiner*—Darryl J Collins

(57) ABSTRACT

An optical system (10) operatively associated with lenses (120) with adjustable focal length is provided. The optical system includes a first lens assembly (12), at least one heat control device (122) and a first barrel (14). The at least one heat control device is configured for regulating a temperature of the at least one lens so as to finely change a refractive index of the at least one lens, whereby the focal length associated with the first lens assembly is adjusted. The first barrel is configured for receiving the first lens assembly therein.

12 Claims, 2 Drawing Sheets

OPTICAL SYSTEM HAVING LENSES WITH ADJUSTABLE FOCAL LENGTH

BACKGROUND

1. Technical Field

The present invention relates to optical systems, and particularly to an optical system having lenses with adjustable focal length associated therewith.

2. Discussion of Related Art

Variable focus lenses are widely used in optical systems. Optical systems incorporating such lenses can, for example, provide focused images of objects at varying distances from the lens on an image plane without changing the distance between the lens and the image plane. The variable focus lenses can also be used in optical systems that provide varying magnification without changing lenses.

Many types of variable focus lenses have been devised. The design most widely used at present in optical instruments, such as cameras, telescopes, binoculars and microscopes, is a multi-element lens module wherein the focal length is varied by changing the internal spacing of one or more of the elements along the optical axis. Generally, the lens system usually uses an actuator, such as step motor, to drive the lens module. However, the step motor is relatively large in volume and consumes a substantial amount of power, especially relative to the amount of power that can be stored in the typical battery system. Use of the motor needs more space for movements of the lenses, which makes the lens system awkward and bulky Therefore, what is needed is an optical system adapted for variable focusing without the need for large mechanical movement.

SUMMARY

An optical system operatively associated with lenses with adjustable focal length is provided. The optical system includes a first lens assembly, at least one heat control device and a first barrel. The at least one heat control device is configured to regulating a temperature of the at least one lens so as to finely change a refractive index of the at least one lens, whereby a focal length associated with the first lens assembly is adjusted. The first barrel is configured for receiving the first lens assembly therein.

BRIEF DESCRIPTION OF THE DRAWINGS

Many aspects of the present optical system can be better understood with reference to the following drawings. The components in the drawings are not necessarily drawn to scale, the emphasis instead being placed upon clearly illustrating the principles of the present optical system. Moreover, in the drawings, like reference numerals designate corresponding parts throughout the several views.

DETAILED DESCRIPTION OF PREFERRED EMBODIMENTS

Reference will now be made to the drawings to describe in detail the preferred embodiments of the present optical system.

Figure 1:
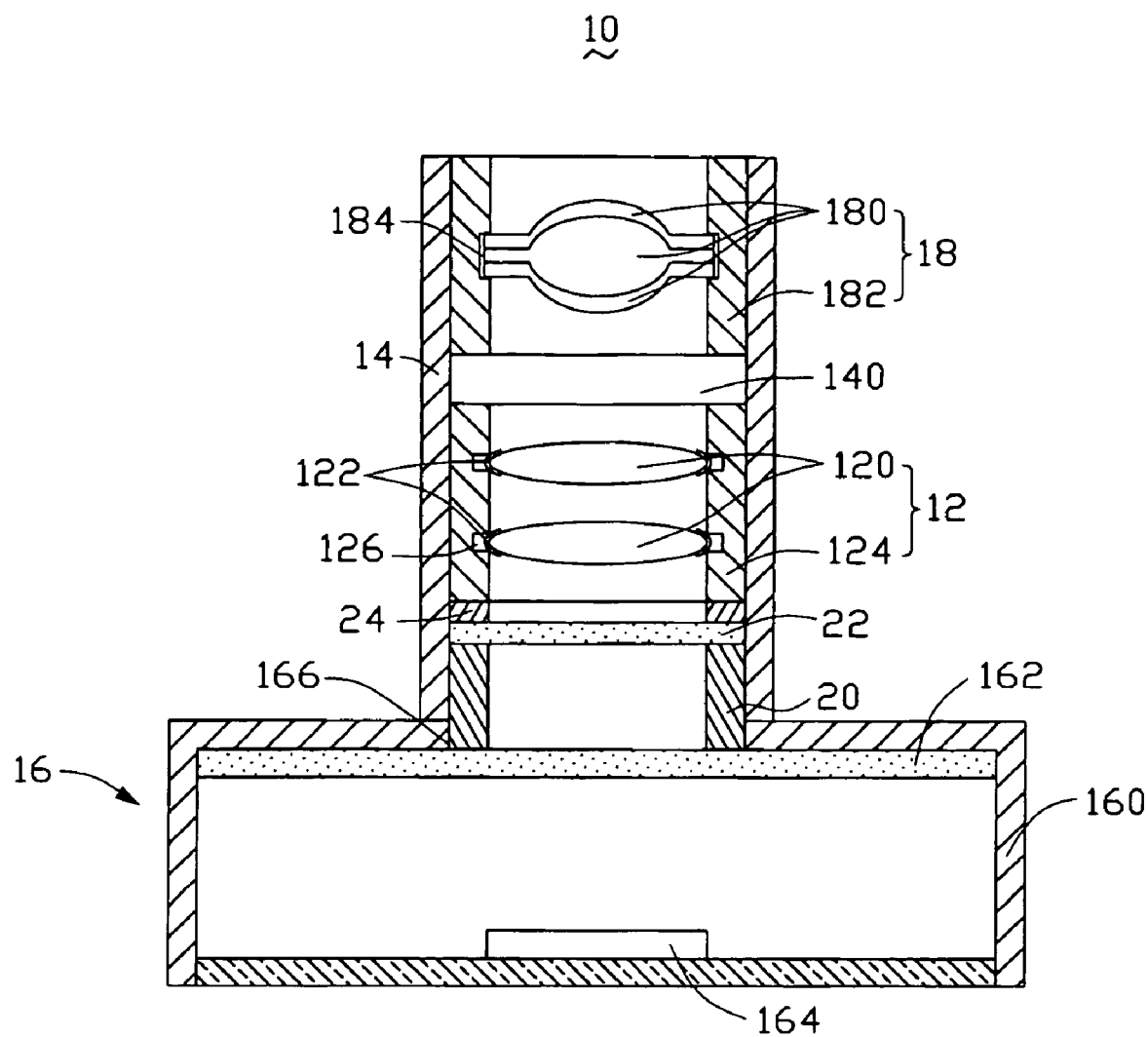
FIG. 1 is a schematic, cross-sectional view of an optical system in accordance with a preferred embodiment.

Referring to FIG. 1, an optical system 10 mainly includes a first lens assembly 12, and a first barrel 14. The first barrel 14 has an inner space 140 for receiving the first lens assembly 12.

The first lens assembly 12 includes at least one lenses 120, at least one heat control devices 122, and a second barrel 124 with at least one grooves 126 defined therein. In the illustrated embodiment, the number of the lenses 120, the heat control device 122, and the grooves 126 is as same as two. The lenses 120, according to the illustrated embodiment, advantageously made of polymer materials, such as, (PFCB), which has adjustable refractive index when being heated/cooled, so that the focal length of the lenses 120 can be changed accordingly The lenses 120 as illustrated are converging lenses. Each lens 120 is surrounded by one heat control device 122. In the illustrated embodiment, the heat control devices 122 are ring-shaped and bound to an edge of each lens 120 via an adhesive, such as thermally cured epoxy. The lenses 120 with the heat control devices 122 are mounted in the grooves 126 of the second barrel 124. The second barrel 124 is received in the first barrel 14 and the second barrel 124 is slidable in the first barrel 14. The heat control devices 122 may be electrical heating elements, such as resistance heat control devices, and thermoelectric thin films, or a thermo-electrical chip that can decrease the temperature of the lenses 120 immediately with change of voltage.

In the illustrated embodiment, the optical system 10 further includes an image sensor device 16, a second lens assembly 18 and an actuator 20.

The image sensor device 16, according to the illustrated embodiment, includes an enclosure 160 having an opening 166 thereon, a sealing plate 162 covering the opening 166, and an image sensor 164 received in the enclosure 160. The sealing plate 162, according to the illustrated embodiment, is a transparent glass plate. The image sensor 164 may be, for example, a sensitive film, a complementary metal-oxide semiconductor (CMOS) image sensor or a charge coupled device (CCD) image sensor. The image sensor 164 is fixed on the bottom of the enclosure 160. In the illustrated embodiment, the first barrel 14 is secured on the enclosure 160 and surrounds the opening 166 thereof.

The second lens assembly 18 includes at least one lens 180 and a third barrel 182 with a least one grooves 184 defined therein. In the illustrated embodiment, the number of the lenses 180 is three. The lenses 180 are advantageously aspheric lenses, which can correct optical aberration.

Figure 2:
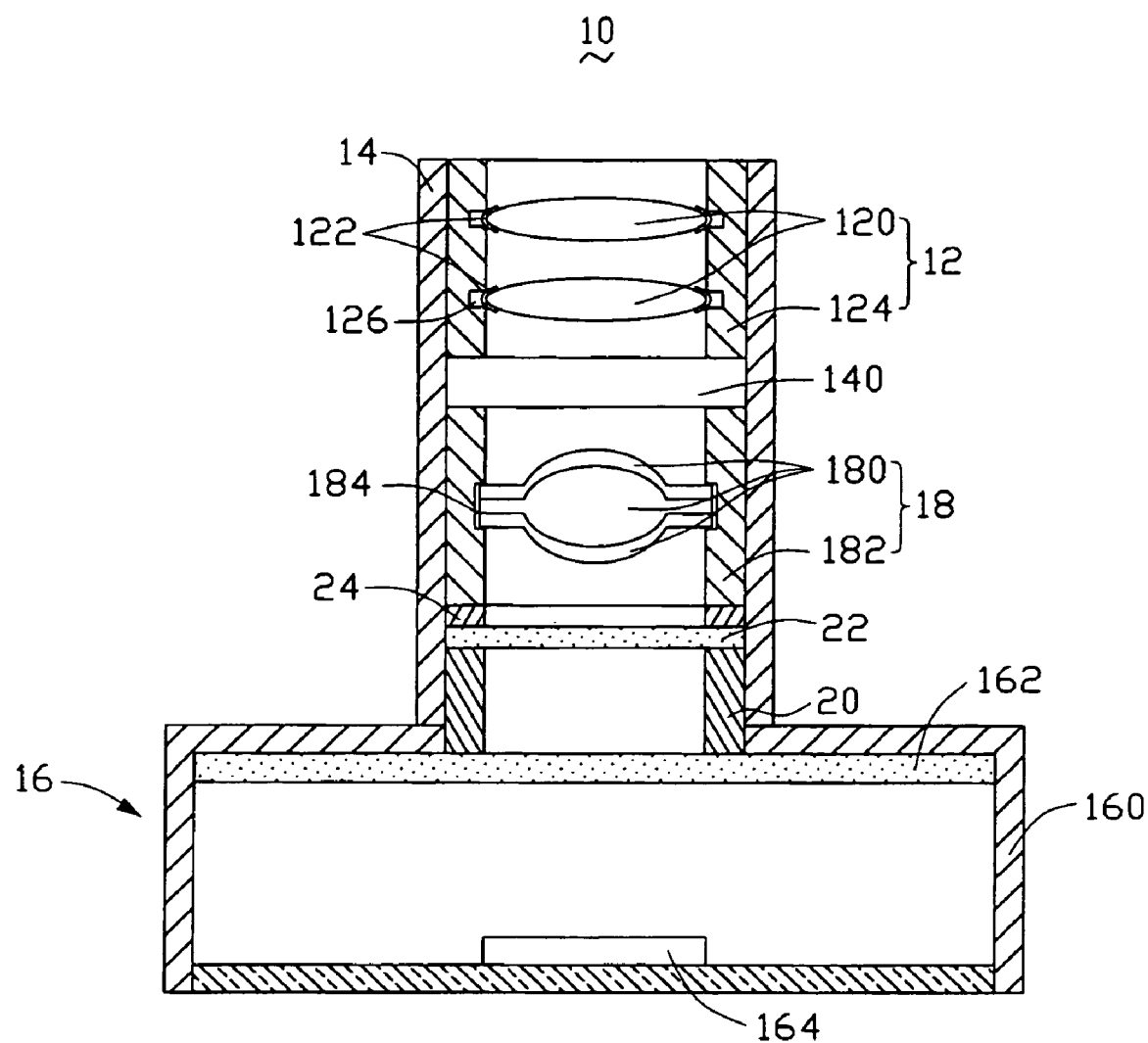
FIG. 2 is a schematic, cross-sectional view of an optical system in accordance with another preferred embodiment.

The actuator 20 is advantageously made of lead zirconate titanate (PZT), or any other piezoelectric materials. As show in FIG. 1, according to an aspect of the present optical system 10, the second lens assembly 18, the first lens assembly 12, and the image sensor 164 are disposed along a light path of incident light. The actuator 20 is fixed between the first lens assembly 12 and the image sensor device 16. The optical axis of the first lens assembly 12 and the optical axis of the second lens assembly 18 coincide. As shown in FIG. 2, according to another aspect of the present optical system 10, the first lens assembly 12, the second lens assembly 18, and the image sensor 164 are disposed along a light path of incident light. The actuator 20 can alternatively be fixed between the second lens assembly 18 and the image sensor device 16.

It is to be noted that, although two lens assemblies 12, 18 and two lenses 120 are exemplarily illustrated herein, more or less lens assemblies and lenses can be optionally employed by those skilled in the art, according to the principles of the present inventions and should be considered to be within the scope of the present invention. The optical system 10 can further includes a filter 22 and a lens aperture 24 set between the lens assemblies 12, 18 and the actuator 20.

The operation principle of the present optical system 10 is described as follows, using the resistance heating element as an example for the heat control device 122.

In operation, (referring FIG. 1) when a voltage is applied to the resistance heating elements 122, the temperature of the resistance heating elements 122 is increased responding to electrical current flowing there through. Being heated by the resistance heating elements 122, the refractive index of the lenses 120 is changed, whereby a focal length associated with the tint lens assembly 12 is adjusted. If the temperature of the lenses 120 is raised, the refractive index of the lenses 120 becomes bigger, and the focal length of the lenses 120 becomes smaller, If the temperature of the lenses 120 is lowered, the refractive index of the lenses 120 becomes smaller and the focal length of the lenses 120 becomes longer.

When a change of the focal length is desired, a voltage may be applied to the actuator 20, such that the piezoelectric members of the actuator 20 drives the first lens assembly 12 to move relative to the image sensor device 16. Namely, expansion or contraction of the piezoelectric members results in the force along the optical axis of the lens assemblies 12, 18, which is, in turn, applied to the second barrel 124. Thereby, the first lens assembly 12 is pushed or pulled by the actuator 20. The internal spacing between the first lens assembly 12 and the second lens assembly 18 is changed, and the focal length of the optical system 10 is adjusted. The adjusting range of the effective focal length of the optical system 10 may be configured to be proportional to the voltages. That is, the effective focal length of the optical system 10 can be adjusted continuously. The optical system 10 may further include a circuit including a sensor element configured for sensing the position of focal plane of the lens assemblies. The signals of the position can be used to control the electric current for the resistance heating elements 122 and the actuator 18. Thereby, the optical system 10 can achieved auto focusing or auto zooming functions.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. An optical system comprising:
   a first lens assembly comprising at least one lens;
   at least one heat control device configured for regulating a temperature of the at least one lens so as to finely change a refractive index of the at least one lens, whereby a focal length associated with the first lens assembly is adjusted;
   a first barrel receiving the first lens assembly therein;
   a second lens assembly arranged coaxially with the first lens assembly;
   an actuator configured for driving either of the first and second lens assembly; and
   an image sensor device comprising an enclosure having an opening, a sealing plate covering the opening, and an image sensor received in the enclosure.

2. The optical system as described in claim 1, wherein the sealing plate is a transparent glass plate.

3. The optical system as described in claim 1, wherein the image sensor is selected from the group consisting of a sensitive film, a complementary metal-oxide semiconductor image sensor, and a charge coupled device image sensor.

4. The optical system as described in claim 1, further comprising a third barrel with at least one groove therein, the third barrel being received in the first barrel, wherein the second lens assembly comprises at least one lens mounted in the at least one inner groove of the third barrel.

5. The optical system as described in claim 4, wherein the at least one lens of the second lens assembly is at least one aspheric lens.

6. The optical system as described in claim 1, wherein the first lens assembly is slidable in the first barrel, and the actuator is fixed between the first lens assembly and the image sensor device.

7. The optical system as described in claim 1, wherein the second lens assembly is slidable in the first barrel, and the actuator is fixed between the second lens assembly and the image sensor device.

8. The optical system as described in claim 1, wherein the actuator is comprised of a piezoelectric material.

9. The optical system as described in claim 1, wherein the heat control device is ring-shaped and bonded to an edge of the lens via an adhesive.

10. The optical system as described in claim 1, wherein the at least one lens is comprised of a polymer material.

11. The optical system, as described in claim 10, wherein the at least one lens is comprised of perfluorocyclobutane.

12. The optical system as described in claim 1, wherein the first barrel is secured on the enclosure and surrounds the opening of the enclosure.

* * * * *